United States Patent [19]

Moake

[11] Patent Number: 4,849,627
[45] Date of Patent: Jul. 18, 1989

[54] PHOTOELECTRIC LITHOLOGY FACTOR AND METHOD OF MEASUREMENT

[75] Inventor: Gordon L. Moake, Houston, Tex.

[73] Assignee: Halliburton Logging Services, Inc., Houston, Tex.

[21] Appl. No.: 197,488

[22] Filed: May 23, 1988

[51] Int. Cl.$^4$ .............................................. G01V 5/00
[52] U.S. Cl. ..................................... 250/255; 250/253
[58] Field of Search ............... 250/269, 262, 253, 255, 250/256; 378/51

[56] References Cited

U.S. PATENT DOCUMENTS 3,058,000 10/1962 Scherbatskoy ..................... 250/269
4,490,609 12/1984 Chevalier ............................ 250/269
4,628,202 12/1986 Minette ............................... 250/262

Primary Examiner—Carolyn E. Fields
Attorney, Agent, or Firm—William J. Beard

[57] ABSTRACT

A method for laboratory measurement of lithology factor L related to the photoelectric absorption properties of a rock sample for use in lighology determinations. By definition $L=(\sigma_T-\sigma_C)/\sigma_C$ where $\sigma_C$ is the Compton cross section $\sigma_T$ is the total photoelectric cross section of the sample which includes the binding-energy corrected Compton cross section and the Rayleigh photoelectric cross sections. A low-energy source of gamma radiation sensitive to photoelectric absorption and a high energy source of gamma radiation that has a significantly different sensitivity to photoelectric absorption are employed and the attenuation of radiation from each source is measured. With the low energy source, radiation count rates $N_L$ and $N_{Lo}$ obtained for measuring attenuated radiation with the sample present and with the sample absent, respectively, and similar count $N_H$ and $N_{Ho}$ are obtained for the high energy source. Lithology factor L and electron density $\rho_e$ are derived by simultaneously solving a first function of the count rates $N_L$ and $N_{Lo}$ and a second function of the count rates $N_H$ and $N_{Ho}$, wherein each of the functions includes the electron density $\rho_e$ and thickness t of the sample. The high-energy measurements are not necessary if an elemental analysis is performed and measurements of the bulk density and sample thickness are made. Lithology factor L may be transformed into a modified photoelectric factor, $P_{em}$ by a linear transform chosen such that $P_{em}$ is identical to the photoelectric factor $P_e$ in pure limestone and sandstone.

17 Claims, 3 Drawing Sheets

PHOTOELECTRIC LITHOLOGY FACTOR AND METHOD OF MEASUREMENT

FIELD OF THE INVENTION

This invention relates to lithology determination, and more particularly to an improved photoelectric lithology factor and a laboratory technique for its measurement.

BACKGROUND OF THE INVENTION

The photoelectric factor ($P_e$) is commonly employed to enhance lithology determination in a borehole environment. It is defined as the formation effective photoelectric absorption cross section and represents an approximation of the photoelectric absorption properties of the formation, which may vary widely from element to element. When combined with formation porosity and bulk density measurements to obtain a volumetric matrix photoelectric cross section, $P_e$ can thus be used to identify formation lithology. The measurement of $P_e$ in boreholes is made with density/lithology tools by combining count rates of high-energy and low-energy gamma rays. The traditional reasoning in correlating $P_e$ to these count rates is based on the assumption that Compton scattering and photoelectric absorption are the only significant interaction mechanisms. Unfortunately, this assumption does not consider Rayleigh scattering and binding-energy corrections to Compton scattering, which are significant for the low-energy gammas used in the $P_e$ measurement and prevent the tools from measuring $P_e$ exactly. Although these effects are minimized by calibrating the tool to $P_e$ values in pure limestone and sandstone, errors persist for other lithologies and when induced by the presence of high-atomic number elements may be significant. Although these errors are typically less than 4 percent in measurements made by a short-spaced detector with an approximate 5 inch spacing between source and detector, they can be as large as 8 percent in halite and 280 percent in coal. In a long-spaced tool measurement, with approximate 12 inch spacing between source and detector, the errors are only slightly smaller.

The presence of Rayleigh scattering and binding-energy corrections to Compton scattering in all low-energy scattering processes also complicates the laboratory measurement of $P_e$, which measurements are useful in determining accurate values for $P_e$ standards and in comparing tool response to core samples from wells. Previously, to check or calibrate a tool, the $P_e$ of samples has been determined by calibrations from an elemental analysis performed on a core sample. However, there are drawbacks to this method in that the calculation of $P_e$ values accurate to 0.05 can be difficult to achieve, due to the presence of elements that were omitted in the analysis or to uncertainties in the analyses of high-atomic-number elements. Another drawback is that the equation used to calculate $P_e$ only approximates photoelectric absorption, and this approximation introduces large errors when high-atomic number elements are present, e.g. barium at the 0.1 percent level.

To reduce errors caused by the high-atomic member elements, others have made $P_e$ measurements using a bremsstrahlung x-ray beam in a method which requires an elemental analysis of the sample to extract Rayleigh scattering effects. Such method is predicated on the thesis that it is better to use the elemental analysis to calculate a correction to the $P_e$ measurement than to use it to calculate the $P_e$ factor itself, and although the method removes some of the inaccuracies of $P_e$ determination, it has not removed the need for an elemental analysis.

SUMMARY OF THE INVENTION

The invention relates to the definition and measurement of a lithology factor L for use in lithology determinations based on properties of photoelectric absorption of gamma radiation by a rock sample. This definition, $L = (\sigma_T - \sigma_C)/\sigma_C$, which is in terms of the total photoelectric cross section of the sample material and the Compton scattering cross section closely correlates to what conventional density/lithology tools actually measure. The laboratory method for measurement of L requires the use of a low-energy source of gamma radiation that is sensitive to photoelectric absorption and a high-energy source of gamma radiation that has a significantly different sensitivity to photo-electric absorption than the low-energy source. Attenuation of gamma radiation through the sample from each source, is measured by a NaI(Tl) detector for detecting the radiation through the sample and detecting the radiation from each source in the absence of the sample. From the detected radiation from the low energy source, count rates $N_L$ and $N_{Lo}$ are obtained with the sample present and the sample absent, respectively. Similarly, from detected radiation from the high energy source, count rates $N_H$ and $N_{Ho}$ are obtained with the sample present and the sample absent, respectively. The method further includes the derivation of L by simultaneously solving a first function of the count rates $N_L$ and $N_{Lo}$ and a second function of the count rates $N_H$ and $N_{Ho}$ wherein each of the functions includes the electron density $\rho_e$ thickness t of the sample. The first and second functions may also be solved to obtain the value $\rho_e t$ from which $\rho_e$ may be determined. To accommodate analysts accustomed to working with the conventional photoelectric factor $P_e$, the lithology factor L may be transformed into a modified $P_e$, $P_{em}$, by a linear transform chosen such that $P_{em}$ is identical to $P_e$ in pure limestone and sandstone.

RAYLEIGH SCATTERING EFFECTS

Figure 1A:
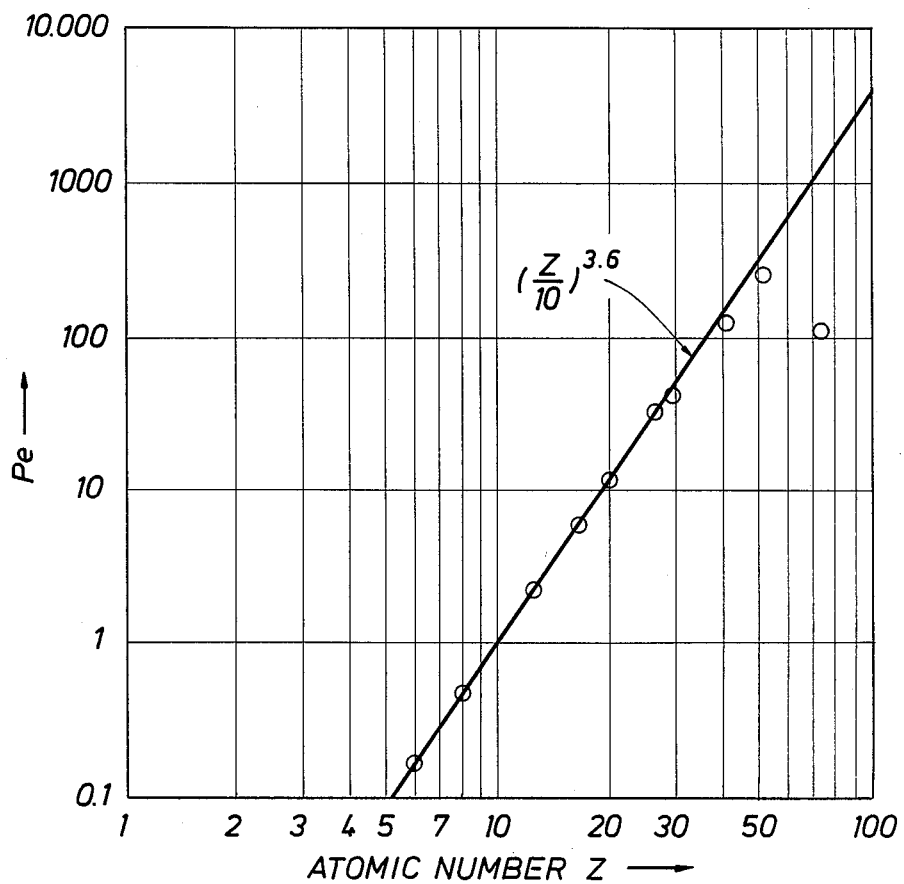
FIG. 1a is a graphical illustration which compares the physical quantity $P_e$ given by $P_e = 4.281\, \sigma_{P,59.5}/\sigma_{C,59.5}$ with the definition of $P_e$ given by $Pe \equiv (Z/10)^{3.6}$.

Although the interaction of photons with atomic electrons is a single process, it is usually divided into different categories, depending on the energy of the incident photon and the binding energy of the electron. In Compton scattering, the energy of the photon is much larger than the binding energy of the electron, so the binding can be ignored. When the photon energy is low enough so that the binding energy is important and so that the photon can interact with more than one electron at a time, the process is called Rayleigh scattering, which is the coherent scattering of photons by bound atomic electrons in which the atom is neither ionized nor excited. There is also an intermediate zone where the photon interacts with only one electron but binding effects are not totally negligible and in this region it is necessary to apply binding-energy corrections to Compton scattering.

The characteristics of the scattering resulting from photon interaction with electrons varies dramatically depending on the energy of the gamma rays. For photon energies much less than the binding energy, the cross section is much smaller than the Compton cross section and is proportional to the photon energy to the fourth power, which is the case in the scattering of light off of air molecules, and is responsible for the sky being blue. For photons with energies near the binding energy of the electron, the Rayleigh scattering cross section resonates, becoming much larger than the Compton cross section, and is the case of concern in the detection of gamma rays by density/lithology tools since Rayleigh scattering affects the response of the tools by scattering low energy gammas away from the detector and thereby reducing the count rate from what would be obtained in the absence of Rayleigh scattering.

Although scattering is known to be strongest in the forward direction, it has been shown that most of the gammas that undergo Rayleigh scattering in route to the short-spaced detector will not be detected. Since the long-spaced detector uses wider collimation than the short-spaced, a similar analysis shows that about half of the gammas that Rayleigh scatter en route to the long-spaced detector will be lost. Thus, Rayleigh scattering should be considered when analyzing the response of either detector. However, since the number of Rayleigh-scattered gammas that are lost on the way to the detector will vary with the elemental composition of the formation, the long-spaced detector response will be more difficult to predict.

From cross sections compiled and published in the paper "Photon Cross Sections, Attenuation Coefficients, and Energy Absorption Coefficients from 10 keV to 100 GeV, J. H. Hubbell, NSRDS—NBS 29, August, 1969", it can be shown that for 60 keV gamma rays, which are in the midrange of those used to calculate $P_e$, the sum of the Rayleigh cross section ($\sigma_R$) and the binding-energy correction to the Compton cross section ($\sigma_{bC} - \sigma_C$) divided by the photoelectric cross section ($\sigma_p$), ($\sigma_R + \sigma_{bc} - \sigma_C)/\sigma_p$, is 0.60 for oxyen and 0.12 for calcium. It is therefore evident that the combination of Rayleigh scattering and corrections to Compton scattering contribute significantly to the lithology measurement. Furthermore, variations of this ratio with atomic number, as illustrated with the above values for oxygen and calcium, indicate that the effect of Rayleigh scattering and binding-energy corrections to Compton scattering cannot be totally removed by renormalizing the photoelectric cross section.

It is therefore to be recognized that the lithological response of most density/lithology tools, especially those that make a $P_e$ measurement with a well-collimated detector, is not accurately represented by the conventional photoelectric cross section $\sigma_p$. It is therefore submitted herein that a more accurate representation is $\sigma_T - \sigma_C$ where $\sigma_C$ is the Compton cross section and $\sigma_T$ is the total cross section which includes therein, the photoelectric, Rayleigh, and binding-energy-corrected Compton cross sections.

A lithology factor L may then be defined as $$L = (\sigma_{T,59.5}/\sigma_{C,59.5}) - 1, \quad (1)$$

where $\sigma_{T,59.5}$ and $\sigma_{C,59.5}$ are the total and Compton atomic cross sections for 59.5 keV photons. At these energies, the only significant components of $\sigma_T$ are $\sigma_{bC}$ (the Compton cross section corrected for binding energy effects), $\sigma_p$ and $\sigma_R$ (the Rayleigh cross section), such that $$\sigma_T = \sigma_{bC} + \sigma_p + \sigma_R \quad (2)$$

The energy value of 59.5 keV is chosen to facilitate the laboratory measurement of L. The variation of $\sigma_T/\sigma_C - 1$ from 40 to 100 keV is the same for all atomic numbers of interest as shown below in TABLE 1 which lists values of $F = (\sigma_T/\sigma_C) - 1$ calculated for 40, 60, 80 and 100 keV, scaled to F at 60 keV. The number of significant digits is limited by the accuracy of the theoretical calculations. Since the $P_e$ measurement is made with gamma rays in this energy range, the lithological response of the tool is therefore proportional to L over the energy range of 40 to 100 keV.

TABLE 1

| Z | $F_{40}/F_{60}$ | $F_{60}/F_{60}$ | $F_{80}/F_{60}$ | $F_{100}/F_{60}$ |
|---|---|---|---|---|
| 4 | 2. | 1 | .4 | .4 |
| 6 | 3. | 1 | .5 | .3 |
| 8 | 2.9 | 1 | .5 | .3 |
| 12 | 3.1 | 1 | .47 | .26 |
| 16 | 3.12 | 1 | .46 | .25 |
| 20 | 3.12 | 1 | .457 | .25 |
| 26 | 3.11 | 1 | .452 | .244 |

In order to compute L for a compound, it is convenient to rewrite equation (1) as $$L = (\sigma_T - \sigma_C)/\sigma_C \quad (3)$$

L is then computed from the total cross section and the Compton cross section of the compound. The Compton cross section for an atom, $\sigma_C$, is equal to Z times the Compton cross section for a single electron. Using the table of J. H. Hubbell, in the publication, "Photon Cross Sections from 10 keV to 100 GeV, J. H. Hubbell, NSRDS—NBS 29, August 1969," and interpolating from the table for 59.5 keV gammas yields a value of 0.5464 barns per electron. (A barn is $10^{-24}$ cm$^2$) Using this in equation (3) yields $$L = \frac{\sum_i (\delta_T - \delta_C)i}{0.5464 \sum_i Z_i} \quad (4)$$

where $Z_i$ represents the atomic number of the $i^{th}$ element in the compound. Values of $(\sigma_T - \sigma_C)$ at 59.5 keV are listed below in Table 2 for elements commonly found in minerals.

The equation derived for a volumetric combination of several compounds, where $V_j$ and $\rho_{e,j}$ are the fractional volume and electron density of the $j^{th}$ compound, is given by $$L = \left( \sum_j V_j \rho_{e,j} L_j \right) / \sum_j V_j \rho_{e,j} \quad (5)$$

TABLE 2

Relevant cross sections, in barns ($10^{-24}$ cm$^2$), at 59.5 keV for various elements.

| Z | Element | $\delta_R + \delta_{bc} - \delta_C$ | $\delta_P$ | $\delta_T - \delta_C$ |
|---|---------|-------------------------------------|------------|------------------------|
| 1  | H  | (<.001) | (<.001) | (<.001) |
| 6  | C  | .122   | .118   | .240   |
| 8  | O  | .274   | .460   | .734   |
| 11 | Na | .741   | 2.04   | 2.78   |
| 12 | Mg | .928   | 3.05   | 3.98   |
| 13 | Al | 1.15   | 4.44   | 5.59   |
| 14 | Si | 1.39   | 6.16   | 7.55   |
| 16 | S  | 2.00   | 11.1   | 13.1   |
| 17 | Cl | 2.34   | 14.4   | 16.8   |
| 19 | K  | 3.12   | 23.5   | 26.6   |
| 20 | Ca | 3.55   | 29.4   | 33.0   |
| 22 | Ti | 4.57   | 44.7   | 49.2   |
| 26 | Fe | 7.11   | 92.7   | 99.8   |
| 29 | Cu | 9.84   | 149    | 158    |
| 56 | Ba | 56.4   | 1892   | 1948   |

Except for barium, whose values were obtained from the tables in the publication by E. Storm and H. I. Israel, "Photon Cross Sections from 1 keV to 100 MeV for Elements Z=1 to Z=100," Nuclear Data Tables, A7 565-681 (1970), all other values in TABLE 2 were calculated using interpolations from the tables of J. H. Hubbell, listed above.

DEFINITION OF A MODIFIED $P_e$

Although L is an acceptable lithology factor in its own right, analysts are accustomed to working with $P_e$, and it is useful to transform this new lithology factor so as to measure values similar to $P_e$. This is easily accomplished by a linear transform, defined such that $P_e$ and $P_{em}$ agree exactly in pure limestone and pure sandstone formations. The transform is given by $$P_{em} = 4.389 \, L - 0.609 \quad (6)$$

Defined in this way, $P_{em}$ should closely agree with a properly calibrated density/lithology tool.

When working with a compound, $P_{em}$ must be calculated by first computing L for the compound with equation (4) and then applying equation (6). When dealing with a mixture of compounds, L must be computed for the entire compound before equation (6) is applied. However, an alternative exists. Applying the transform of equation (6) to equation (5) yields $$P_{em} = \left( \sum_j V_j \rho_{e,j} P_{em,j} \right) / \sum_j V_j \rho_{e,j} \quad (7)$$

which is identical to the equation used to compute $P_e$ from a mixture of compounds.

In TABLE 3 below which lists values of L, $P_e$ and $P_{em}$ for many common elements and minerals, it is to be noted that $P_{em}$ is negative in low-$P_e$ materials. It is also to be noted that the difference between $P_e$ and $P_{em}$ is less than 4 percent for most common minerals, Thus, differences between $P_e$ and $P_{em}$ should be less than 0.15 for most sedimentary rocks ($P_e$'s between 1.5 and 5.5).

TABLE 3

Lithology parameters for various materials.

| Name | Formula | Molecular Weight | Z | L | $P_e$ | $P_{em}$ |
|------|---------|------------------|---|---|-------|----------|
| A. Elements | | | | | | |
|  | H  | 1.008   | 1  | (<.001) | (<.01) | −.61 |
|  | C  | 12.011  | 6  | .073 | .16  | −.29 |
|  | O  | 15.999  | 8  | .168 | .45  | .13  |
|  | Na | 22.990  | 11 | .463 | 1.41 | 1.42 |
|  | Mg | 24.305  | 12 | .607 | 1.93 | 2.06 |
|  | Al | 26.982  | 13 | .787 | 2.57 | 2.84 |
|  | Si | 28.086  | 14 | .987 | 3.36 | 3.72 |
|  | S  | 32.066  | 16 | 1.50 | 5.43 | 5.97 |
|  | Cl | 35.453  | 17 | 1.81 | 6.75 | 7.33 |
|  | K  | 39.098  | 19 | 2.56 | 10.1 | 10.6 |
|  | Ca | 40.078  | 20 | 3.02 | 12.1 | 12.6 |
|  | Ti | 47.88   | 22 | 4.09 | 17.1 | 17.4 |
|  | Fe | 55.847  | 26 | 7.02 | 31.2 | 30.2 |
|  | Ba | 137.33  | 56 | 63.7 | 494  | 279  |
| B. Minerals | | | | | | |
| Anhydrite | CaSO$_4$ | 136.146 | | 1.32 | 5.05 | 5.18 |
| Barite    | BaSO$_4$ | 233.39  | | 34.6 | 267  | 151  |
| Calcite   | CaCO$_3$ | 100.09  | | 1.30 | 5.084 | 5.085 |
| Carnallite | KCl—MgCl$_2$.6H$_2$O | 277.88 | | 1.10 | 4.09 | 4.22 |
| Corundum  | Al$_2$O$_3$ | 101.96 | | .490 | 1.55 | 1.54 |
| Dolomite  | CaCO$_3$.MgCO$_3$ | 184.42 | | .883 | 3.14 | 3.05 |
| Gypsum    | CaSO$_4$.2H$_2$O | 172.18 | | 1.05 | 3.99 | 4.00 |
| Halite    | NaCl     | 58.45   | | 1.28 | 4.65 | 5.01 |
| Hematite  | Fe$_2$O$_3$ | 159.70 | | 4.86 | 21.5 | 20.7 |
| Ilmenite  | FeO.TiO$_2$ | 151.75 | | 3.84 | 16.6 | 16.3 |
| Magnesite | MgCo$_3$ | 84.33   | | .28  | .83  | .62  |
| Magnetite | Fe$_3$O$_4$ | 231.55 | | 5.03 | 22.2 | 21.5 |
| Pyrite    | FeS$_2$  | 119.98  | | 3.98 | 17.0 | 16.8 |
| Quartz    | SiO$_2$  | 60.09   | | .550 | 1.806 | 1.806 |
| Rutile    | TiO$_2$  | 79.90   | | 2.44 | 10.1 | 10.1 |
| Sylvite   | KCl      | 74.557  | | 2.21 | 8.51 | 9.08 |

TABLE 3-continued

Lithology parameters for various materials.

| Name | Formula | Molecular Weight | Z | L | $P_e$ | $P_{em}$ |
|---|---|---|---|---|---|---|
| C. Liquids |  |  |  |  |  |  |
| Water | $H_2O$ | 18.016 |  | .134 | .36 | −.02 |
| Salt Water | (120 Kppm NaCl) |  |  | .255 | .81 | .51 |
| Oil | $CH_{1.6}$ |  |  | .058 | .13 | −.36 |
|  | $CH_2$ |  |  | .055 | .12 | −.37 |
| D. Miscellaneous |  |  |  |  |  |  |
| Average Shale |  |  |  | .905 | 3.423 | 3.364 |
| Anthracite Coal | C:H:N:O: = 1000:358:9:22 |  |  | .072 | .16 | −.29 |
| Bituminous Coal | C:H:N:O: = 1000:793:15:78 |  |  | .074 | .17 | −.29 |

ANALYTIC APPROXIMATIONS

The original intent of $P_e$ was that it should represent the photoelectric cross section of the atom, scaled so as to remove the dependence on the energy of the incident gamma. This concept is represented by $$P_e = 4.281 \, \sigma_{P,59.5}/\sigma_{C,59.5} \quad (8a)$$

wherein the constant in equation (8a) is arbitrary, and is chosen to yield the same value of $P_e$ as that calculated with equation (8b) below for atomic number Z=16. Also the energy dependence has been removed by specifying cross-sectional values at 59.5 keV. However, the actual definition of $P_e$ is an approximation to this concept, $$P_e = (Z/10)^{3.6} \quad (8b)$$

The accuracy of this definition, compared to the concept it is intended to represent, is good for Z's from 1 to 16, but it deteriorates beyond this range, as shown in FIG. 1a, which compares the physical quantity which $P_e$ is supposed to represent (circled dots), as given by equation (8a), and $P_e$ (solid line) given by equation (8b). This deterioration will affect comparisons between tool measurements and calculations for medium and large Z elements.

It should be noted that $P_e$ as specified by either equation (8a) or (8b( is unitless. Nevertheless, it is often quoted with units of barns per electron which is misleading, since $P_e$ does not have the magnitude or energy dependence of the photoelectric cross section per electron. Thus, in the interest of simplicity and clarity, $P_e$ should be quoted as a unitless quantity.

An approximation similar to equation (8b) can be found for L, $$L = (Z/14)^{3.13} \quad (9)$$

Figure 1B:
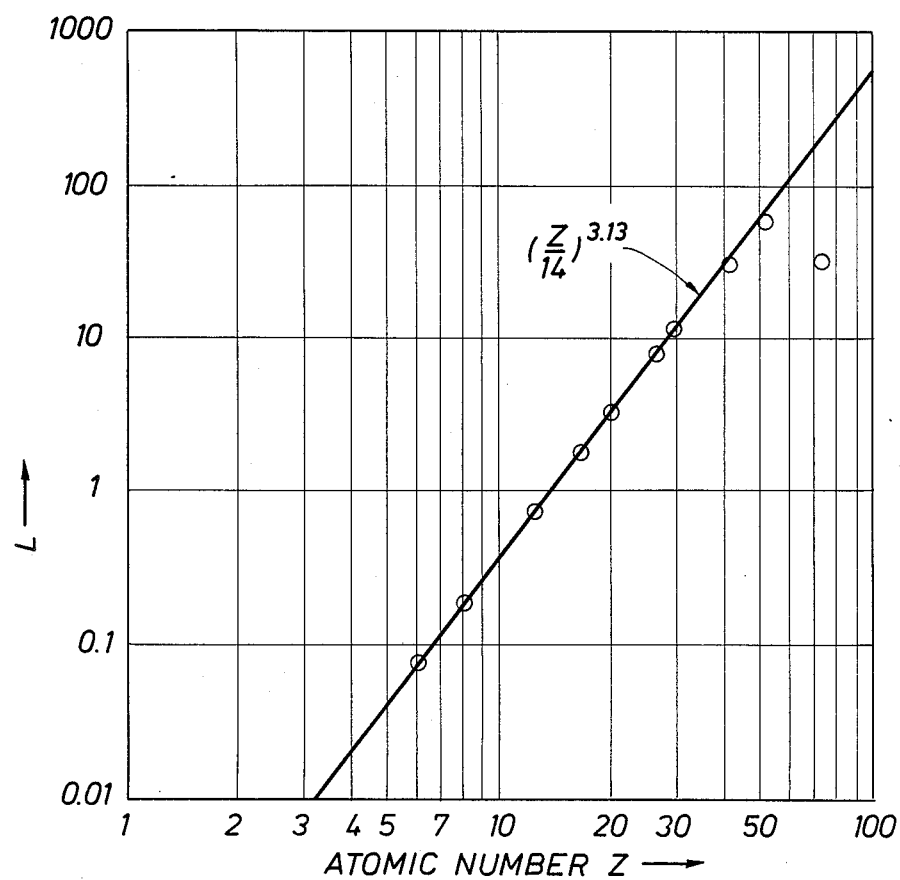
FIG. 1b is a graphical illustration which compares the lithology factor L given by $$L = (\sigma_{T,59.5}/\sigma_{C,59.5}) - 1 \text{ with } L = (Z/14)^{3.13};$$

The accuracy of this approximation, shown in FIG. 1b, is actually better than the approximation for $P_e$. FIG. 1b compares the lithology factor L (circled dots), given by equation (1) with an approximation to L (solid line), given by eqation (9). Combining equations (6) and (9) yields an approximation for $P_{em}$.

$$P_{em} = (Z/8.73)^{3.13} - 0.609 \quad (10)$$

Although equations (9) and (10) are better approximations than the one used to define $P_e$, the definition of L and $P_{em}$ should still be taken as equations (1) and (6). This distinction is particularly important when dealing with high atomic numbers.

MEASUREMENT TECHNIQUE

Besides providing a better prediction for tool response, lithology factor L is useful because it can be measured in the laboratory by measuring the attenuation of gamma rays through the sample, in a manner very similar to the measurement of $P_e$ by the density/lithology tool. Two gamma ray sources must be used, a low-energy source that is sensitive to photoelectric absorption, and a high-energy source that has a significantly different sensitivity to photoelectric absorptions than the low energy source. In the preferred embodiment, an americium −241 and cesium −137 source are used. The americium source is collimated and the cesium source is uncollimated since scattering from collimation tends to degrade the energy resolution of the system. Low-energy gamma rays (59.5 keV are passed through the sample and measured with a NaI(Tl) detector. Since the low-energy gammas are affected by Compton scattering as well as photoelectric absorption, the product of the electron density and sample thickness must be known. This product can be determined from the attenuation of high-energy gamma rays (662 keV) by the sample, although, an alternative that utilizes an elemental analysis of the sample in conjunction with measurements of the bulk density and sample thickness is more accurate for samples in good physical condition.

Figure 2:
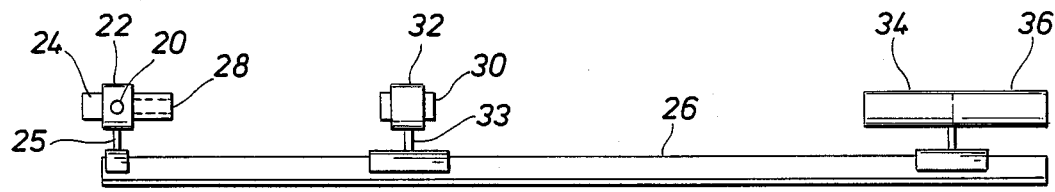
FIG. 2 is a schematic illustration of apparatus for making measurements of $P_{em}$ in the laboratory.

As shown in FIG. 2, the laboratory measuring apparatus comprises the source 20 carried in a suitable source holder 22 adapted to accommodate either the Am$^{−241}$ or the Cs$^{−137}$ source container 24. The source holder 22 is mounted on one end of an optical rail 26 by a mounting bracket 25. A steel collimator 28 is also affixed to the source holder 22 for directing the gamma radiation through a sample target 30 which is carried in a target holder 32. The target holder 32 is mounted on the optical rail 26 by a suitable mounting bracket 33 in direct alignment with the source 20 and a radiation detector 34 mounted on the other end of the optical rail. Preferably, the detector is a NaI(Tl) crystal and in the embodiment shown is a two inch diameter by two inch long crystal encased in aluminum. A photomultiplier 36 for amplifying detector pulses is also provided in close proximity to the detecting crystal.

Figure 3:
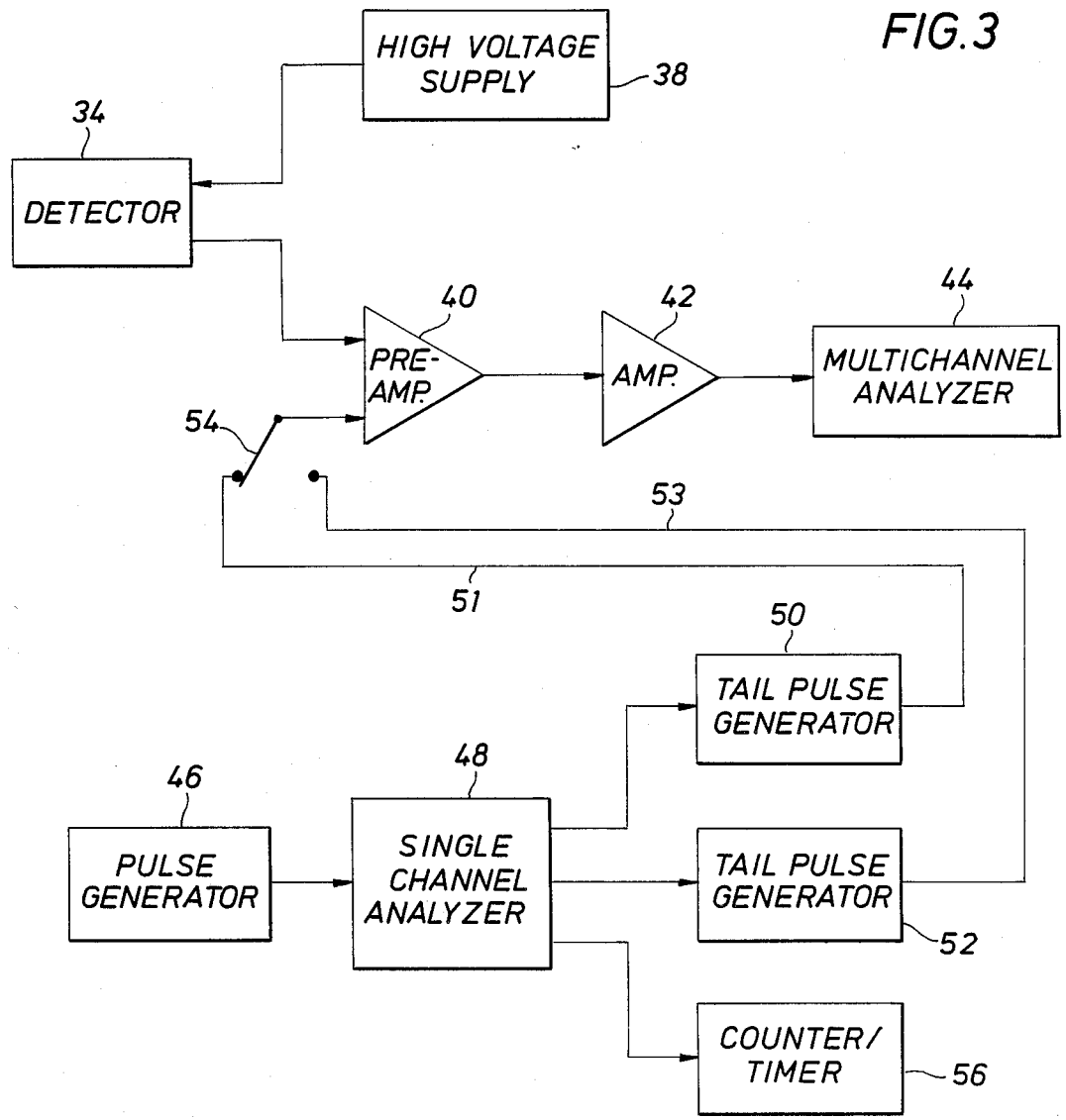
FIG. 3 is a schematic diagram of the electronics associated with the laboratory measuring apparatus in FIG. 2.

The electronics portion of the apparatus which processes detector output is shown schematically in FIG. 3. High voltage to the detector 34 is supplied by a high voltage supply 38. The output of the detector 34 is supplied to a pre-amplifier 40, the output of which is further amplified by an amplifier 42 and sent to a multi-channel analyzer 44 for processing.

To correct for dead time, means are provided for making an external dead time measurement. This is achieved by using a pulse generator 46 to create voltage pulses similar to those produced by the detector 34, but with an amplitude set above the spectrum generated by the source 20. The artificial pulses, triggered by the pulse generator 46 are first passed through a single channel analyzer 48 in order to provide clean pulses which are delivered to a tail pulse generator 50. The tail pulse generator output is then delivered by a conductor 51 to the pre-amplifier 40. Amplitude adjustment of the artificially generated pulses to accommodate the two different sources 20 is avoided by providing a second tail pulse generator 52, the output of which may also be connected to the pre-amplifier 40 by a conductor 53. Each of the tail pulse generators is set for a different source, either americium −241 or cesium −137 in the preferred embodiment, and switched in and out of the circuit by a switch 54 which connects the conductor 51 or conductor 53 to the pre-amplifier 40. Data is collected in the analyzer 44 in real-time mode and the number of pulses generated by the pulse generator 46 is counted by a dual counter/timer 56. Comparison of the number of detected pulser events to the number generated yields the dead time, which may be supplied as a correction in the analysis of detector pulses.

Samples can be solid, liquid, or powder. They can be up to several inches across, with a minimum of one inch. However, smaller diameter samples can be accommodated by placing them closer to the source and recalibrating. The optimum sample length depends on the density and $P_{em}$ of the sample, and typically ranges from one to one and a half inches. For optimum results, the faces of rock samples must be cut perpendicular to the sides and ground smooth and perpendicular so as to assure that the thickness measured with a caliper or the cesium gamma source is the same as that seen by the americium source. Liquid and powder samples must be placed in a plastic, rectangular container of appropriate dimensions.

MEASUREMENT PROCEDURE

Figure 4:
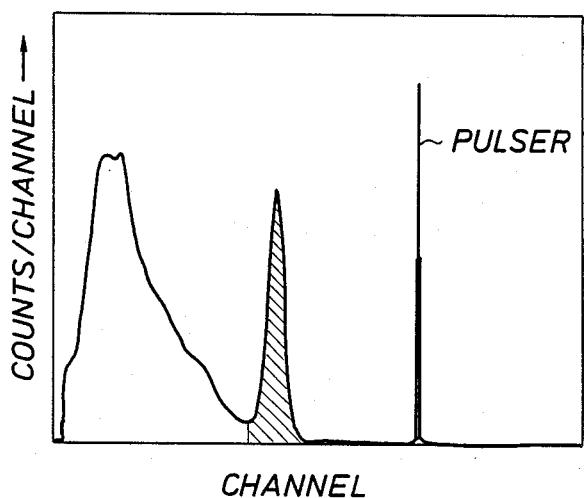
FIG. 4 is a graph of the spectrum presented by a $^{137}$Cs source for a one inch long marble sample.
Figure 5:
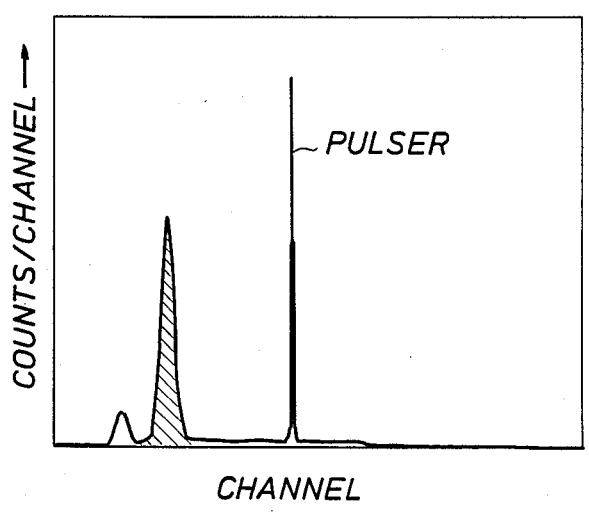
FIG. 5 is a graph of the spectrum presented by a $241_{Am}$ source for the same marble sample of FIG. 4.

Sample spectra for the two sources for a one inch long marble sample are shown in FIGS. 4 and 5 along with the energy windows used in the measurement. The shaded portion of the spectra, along with pulser peaks, were used in calculation. It is to be noted in FIG. 5, that the americium spectrum has two peaks. The lower-energy peak originates from a combination of two events: photoelectric absorption of the 60 keV gamma ray by an electron bound to an iodine atom in the NaI(Tl) crystal, and the subsequent escape of the resultant 29 keV capture X-ray from the crystal. Since this happens relatively often with an americium source, a second peak 29 keV lower than the main peak was generated. In principle, the count-rate window could encompass both the primary and escape peaks, but since this arrangement would be more likely to detect scattered radiation, only the primary peak should be used.

In the measurement example described herein, data were accumulated for each source, with and without the sample in place. Simultaneously, the clock on the counter/timer was started to count the number of pulser signals input to the system. After each run, the count rates measured with the analyzer from the source and pulser are recorded along with the average count rate of the pulser trigger. The measured pulser count rate should include a background subtraction computed from the count rates in adjacent channels, to account for pile-up. Also, a background measurement should be made for each source, with the sources out of the system and properly shielded.

When working with samples known to be uniform and whose faces are very smooth and perpendicular to the sides, all of the measurements with one source may be made sequentially so that only one or two measurements needs to be made with no sample. If not the case, however, then the measurement sequence should be as follows: source one with no sample, source one with sample, source two with sample, and source two without a sample. Since the source holder is adapted to position the two sources in the same place and the detector remains fixed, this procedure assures that the gammas from the two sources traverse the same section of the sample.

Two dead-time corrections are also to be applied, each made by dividing the measured counts by the fractional live time. The first fractional live time ($LT_1$) can be computed by dividing the number of pulser events measured by the analyzer ($n_{pm}$) by the number actually generated ($n_{pg}$), $$LT_1 = n_{pm}/n_{pg} \qquad (11)$$

The second, which accounts for the dead time genrated by the pulser peak itself, can be calculated from $$LT_2 = 1 - n_{pm}\tau \qquad (12)$$

where $\tau$ is the dead time associated with the channel of the pulser peak. The dead time can also be experimentally determined for the analyzer by measuring how the count rate of a source varies with the pulser count rate. If n is the measured count rate from the source, then the dead-time-corrected count rate, $n_{dtc}$, is given by $$n_{dtc} = n/(LT_1 \cdot LT_2) \qquad (13)$$

Typically, $LT_1 \geq 0.90$ and $LT_2 \geq 0.995$.

There are two different types of background subtractions also to be made. The first accounts for the detection of gamma rays generated by sources other than the one in the system. The other accounts for scattering from the target holder and sample. Scattering from the sample holder can be easily measured by measuring the count rates with and without the holder in the system. Scattering from the sample is determined by measuring the count rate with different size samples. Because the americium source was collimated, it only required a background subtraction that accounted for other sources.

MEASUREMENT THEORY

For the attenuation measurement considered here, the measured count rate with the sample present, N, is given by $$N = N_o \exp(-a'\rho\sigma_T t/A) \qquad (14)$$

where $N_o$ is the count rate measured with the low-energy source with no sample, $a'$ is a constant, t is the thickness of the sample and A is the average atomic number of the material. Using the proportionality between $\sigma_C$ and Z, equation (1), and the relation for electron density $$\rho_e = 2\rho Z/A \qquad (15)$$

equation (14) becomes for 59.5 keV gammas $$N = N_o \exp[-a\rho_e t(L+1)] \quad (16)$$

This can be rewritten to yield $$\rho_e t(L+1) = -c_1 \ln(N/N_o) \quad (17)$$

where $c_1$ is a constant to be determined through calibration. Equation (17) therefore relates attenuation of low-energy gammas to electron density, thickness of the sample, and L. A similar analysis for the 662 keV gammas gives $$\rho_e t(0.0032L+1) = -c_2 \ln(N/N_o) \quad (18)$$

The system must be calibrated to determine $c_2$. The 0.0032L factor is small but not negligible, having a 0.01 g/cc effect on the measured density of limestone.

Equations (17) and (18) can be solved simultaneously for $\rho_e t$ and L. Because of the weakness of the L term in equation (18), an iterative approach works very well. If the sample is of sufficient quality that a reasonable measurement of t can be made, then $\rho_e$ can be determined from $\rho_e t$. $P_{em}$ is then obtained from Equation (6), $P_{em} = 4.389L - 0.609$.

CALIBRATION

Calibrating the apparatus with high purity samples allows for accurate values of L and the ratio of electron density to bulk density to be calculated. Multiplying the calculated electron density to bulk density ratio by the measured bulk density yields the electron density to a very high accuracy. The materials used in the calibration are listed in Table 4.

TABLE 4

Standards used in calibration.

| Sample | Thickness (1 n.) | $\rho_e$(g/cc) | L | $P_e$ | $P_{em}$ |
|---|---|---|---|---|---|
| Polyethylene* | 1.0, 2.0 | 1.0873 | .055 | .119 | −.368 |
| H$_2$O** | 1.5 | 1.110 | .134 | .358 | −.019 |
| Magnesium | 0.5, 1.0, 2.0 | 1.7094 | .607 | 1.928 | 2.06 |
| Aluminum | 0.5, 1.0, 2.0 | 2.5998 | .787 | 2.572 | 2.84 |
| Silicon | 0.5, 1.1, 2.0 | 2.3215 | .987 | 3.358 | 3.72 |
| Sulphur | 0.7, 1.3 | (1.94) | 1.50 | 5.430 | 5.97 |

*Only used in the density calibration
**Only used in the calibration of L.
Measured with the cesium source.

As indicated in Table 4, several different sample thicknesses were used for many of the calibration standards, so that any anomalous dependence on sample thickness could be identified. No such dependence was discovered, as can be seen by the calibration data plotted in FIGS. 6 and 7.

Figure 6:
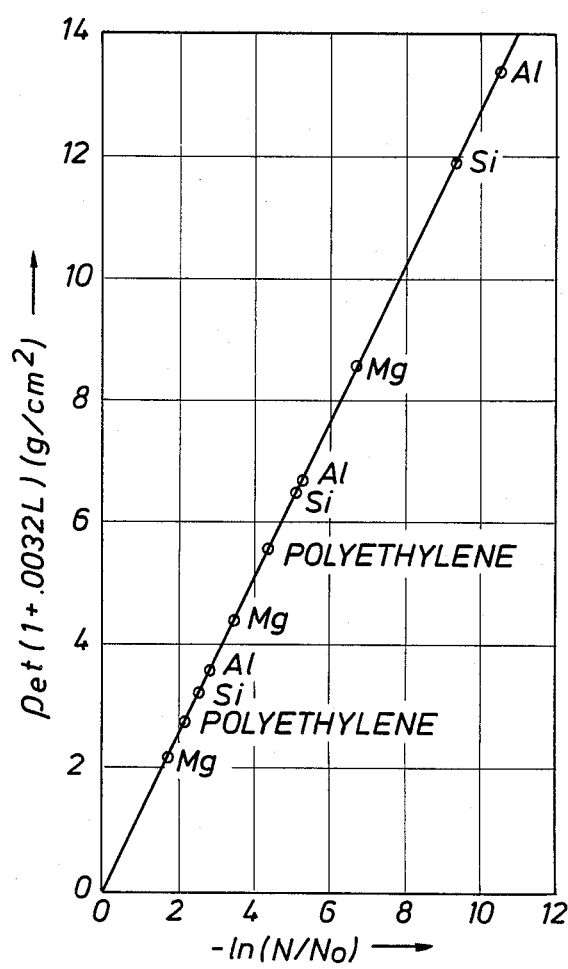
FIG. 6 is a plot of $^{137}$Cs data used to calibrate the equation $\rho_e t(0.0032L + 1) = -C_2 \ln (N/N_o)$ to the electron density response.

A plot is shown in FIG. 6 of the cesium data used to calibrate equation (18) to the electron density response which yielded a value of $c_2 = 12.8091$. Deviations of the data from the calibration line appear to be independent of $\rho_e t(0.0032L+1)$. Assuming the error to be the same for all points yields a standard deviation for $\rho_e t$ of 0.036 g/cm$^2$, which is considerably larger than the statistical errors of about 0.01 g/cm$^2$. The error in $c_2$ was obtained by using 0.036 as the standard deviation for each point and varying $c_1$ until the chi-square of the fit increased by 1.00. This yielded an uncertainty in $c_2$ of 0.155 percent. Thus, the final calibration equations for the cesium source are given (in cgs units) by $$\rho_e t(0.0032L+1) = -12.8091 \ln(N/N_o) \quad (19a)$$

$$\epsilon_{\rho t} = 0.00155 \rho_e t(0.0032L+1) + 0.036 \quad (19b)$$

where $\epsilon_{\rho 2t}$ is the error associated with the measurement of $\rho_e t$.

Figure 7:
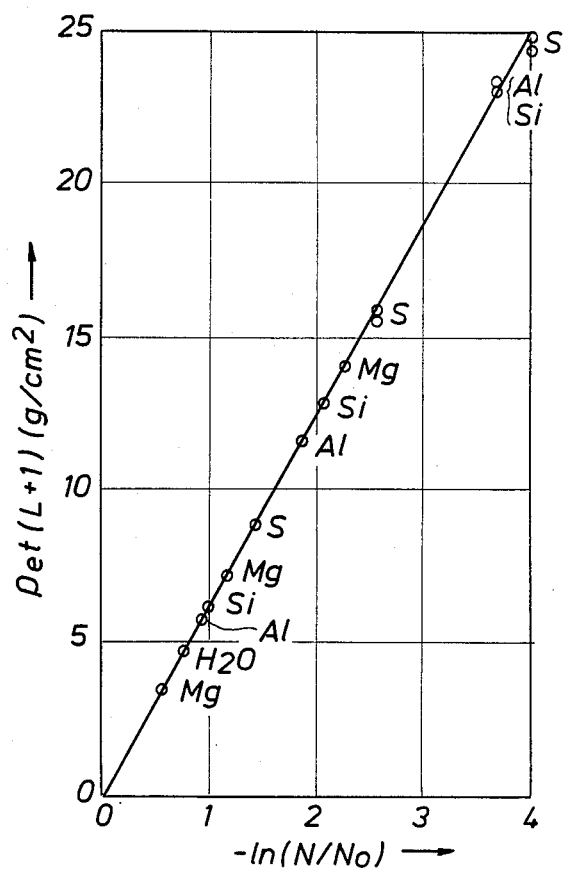
FIG. 7 is a plot of $^{241}$Am data used to calibrate the equation $\rho_e t(L+1) = -c_1 \ln (N/N_o)$ to the lithology response.

A plot is shown in FIG. 7 of the americium data used to calibrate equation (17) to the lithology response, which yielded a value of $c_1 = 6.3035$. The error bars represent a combination of the uncertainties in L and $\rho_e t$. Except for sulphur, the value of $\rho_e t$ was determined from the bulk density measurement and thickness measurements, which introduced a negligible amount of error. The sulphur values were determined from measurements with the cesium source, which introduced a noticeable amount of uncertainty. The calibration equations for the americium source are goven by $$\rho_e t(L+1) = -6.3035 \ln(N/N_o) \quad (20a)$$

$$\epsilon_{\rho tL} = 0.0025 \rho_e t(L+1) + 6.30 \Delta \ln(N/N_o) \quad (20b)$$

where $\epsilon_{\rho tL}$ is the error associated with the measurement of $\rho_e t(L+1)$, and $\Delta \ln(N/N_o)$ is the statistical uncertainty in the logarithm of the ratio $N/N_o$. The uncertainties in the calibration were determined in the same manner as those for the cesium data. In doing this, reasonable chi-squared values were obtained by assigning an uncertainty of 1.8 percent to the value of L calculated from the tables.

Since the quantities determined with equations (19a) and (20a) are proportional to the sample thickness, uncertainties in $\rho_e$ and $P_{em}$ decrease as the thickness increases. However, the calibration samples were limited to two inches in length, so samples should be kept less than two inches. When calculating the error corresponding to L, one must also include the uncertainties in $\rho_e t$. Although the exact uncertainties in the measurements will depend on the sample, the uncertainties for a sample which has not undergone elemental analysis are about 0.01 to 0.02 g/cc in the electron density and 0.04 to 0.07 in $P_{em}$. If the sample is uniform and an elemental analysis has been performed, then the appropriate choice of sample size can reduce uncertainties in $P_{em}$ to 0.02 to 0.04.

MEASUREMENT RESULTS

Measurements on some density standards have been made using this technique. An elemental analysis was also made on the standards, and was used to compute the electron density to bulk density ratio. This was then combined with bulk density measurements to determine the electron density. This measurement, along with a caliper measurement of the thickness, was used to determine the value of $\rho_e t$ used in the calculation of L, so that no cesium measurements were required. The results are given in Table 5 below.

TABLE 5

Comparison between calculated and measured values of L and $P_{em}$. The measured values were obtained from an average of several samples, and the listed errors reflect true variations in the values of the different samples, as well as the statistical and systematic uncertainties of the measurement.

| Block | L from Elemental Analysis | L Measured | $P_e$ from Elemental Analysis | $P_{em}$ from Elemental Analysis | $P_{em}$ Measured |
|---|---|---|---|---|---|
| Quartzite | .568 | .572 ± .011 | 1.89 | 1.88 | 1.90 ± .05 |
| Marble | 1.299 | 1.342 ± .004 | 5.09 | 5.09 | 5.28 ± .02 |
| Diabase | 1.193 | 1.193 ± .020 | 4.66 | 4.63 | 4.63 ± .09 |
| Magnesium* | .719 ± .031 | .734 ± .006 | 2.46 ± 15 | 2.55 ± .13 | 2.61 ± .03 |
| Aluminum* | .864 | .853 ± .006 | 2.93 | 3.18 | 3.13 ± .03 |

*No elemental analysis was done on this specific block. The analysis presented is the nominal one for the alloy.

It is noted that the measured values in Table 5 are in excellent agreement with those calculated from the elemental analysis for all of the blocks except one. The measured $P_{em}$ value for the marble block was 0.19 larger than the calculated value, which indicates that the elemental analysis probably missed some of the higher atomic number elements. This discrepancy is significant and demonstrates the need for measuring $P_{em}$ values rather than calculating them.

$P_{em}$ measurements were also made on the marble, quartzite, and diabase samples before the sides were ground perpendicular. In this case, the vaue of $\rho_e t$ used in the calculation was determined from measurements made with the cesium source. A comparison of these values to those obtained with the method described above is given in Table 6 wherein it will be seen that the two sets of measurements agree within the experimental errors.

Table 6 below lists comparisons of $P_{em}$ determined with and without an elemental analysis. When used, the elemental analysis was combined with a bulk density measurement to determine the electron density. If the elemental analysis was not used, the product of electron density and sample thickness was determined from data taken with the $^{137}$Cs source.

TABLE 6

| Block | Sample | $P_{em}$ with Elemental Analysis | $P_{em}$ without Elemental Analysis |
|---|---|---|---|
| Quartzite | 1 | 1.86 ± .02 | 1.82 ± .04 |
| | 2 | 1.96 | 1.95 |
| | 3 | 1.89 | 1.88 |
| | 4 | 1.89 | 1.87 |
| | 5 | 1.95 | — |
| | Ave. | 1.91 | 1.88 |
| Marble | 1 | 5.27 ± .04 | 5.31 ± .07 |
| | 2 | 5.29 | 5.28 |
| | 3 | 5.29 | 5.16 |
| | 4 | 5.28 | 5.22 |
| | Ave. | 5.28 | 5.24 |
| Diabase | 1 | 4.71 ± .03 | 4.40 ± .07 |
| | 2 | 4.50 | 4.40 |
| | 3 | 4.68 | 4.70 |
| | 4 | 4.61 | — |
| | Ave. | 4.63 | 4.50 |

Although the cesium density measurements were not required, some were made in order to verify the effectiveness of the density measurement. The electron densities determined from the bulk density measurements are 2.6413±0.0005 and 3.0006±0.0006 g/cc for the quartzite and diabase blocks, respectively. The corresponding values measured with the radiation sources are 2.644±0.019 and 2.991±0.019 g/cc. The two sets of measurements are in excellent agreement. Since the samples were only one inch in length, the minimum possible error in $\rho_e$ was not achieved.

It is therefore to be noted that the presence of Rayleigh scattering and binding energy corrections to Compton scattering in all low-energy interactions of gamma rays prohibits a simple laboratory measurement of $P_e$ and moreover, these same phenomena are present in measurements made with density/lithology tools. Although calibration procedures eliminate most of the effects of Rayleigh scattering and binding-energy corrections to Compton scattering, discrepancies between tool response and $P_e$ still persist. Although these discrepancies will be small, in most logging environments they can be important in tool calibration and in developing tool response algorithms that are valid in coal and water.

A solution to these difficulties in laboratory measurements and tool response interpretation has been presented herein by a new parameter L, which incorporates all scattering effects. To provide a more familiar measurement, it is shown that L can be transformed into a modified $P_e, P_{em}$, that has values and characteristics similar to the traditional $P_e$ and will usually be within 0.15 of the traditional $P_e$ in most logging environments. However, where differences do occur, values measured with short-spaced detectors of density/lithology tools correlate closely with $P_{em}$, whereas values measured with long-spaced detectors will be somewhere between $P_e$ and $P_{em}$.

It is also to be noted that other definitions of L could be used, particularly if they can be transformed to $P_{em}$, for example $$L = \frac{2(\delta_T - \delta_C)}{\delta_C} + 0.5.$$

The transform to $P_{em}$ would then be
$P_{em} = 4.389(L - 0.5)/2 - 0.609$

Furthermore, while the method described herein has been described as employing the use of two gamma radiation sources, a low energy source and a high energy source, it is possible to use a single radiation source, such as $^{133}$Ba, which produces radiation encompassing both the low energy range and high energy range suitable for practicing the invention. Another possible alternative source comprises an electron accelerator which can be used to bombard target material, such as tungsten, to produce radiation in appropriate low energy and high energy ranges.

It is therefore to be seen from the foregoing description that in addition to measuring L, a method of measuring in the laboratory, a modified $P_e$, $P_{em}$, has been devised, implemented, and successfully tested. The method also measures the electron density of the sample if the sample thickness is known. With no elemental analysis, accuracies of 0.01 to 0.02 g/cc in the electron density and 0.04 to 0.07 in $P_{em}$ can be achieved. With an elemental analysis and a sample in good condition, the uncertainties in $P_{em}$ can be reduced to 0.02 to 0.04. It is also to be appreciated that the new lithology factor L for a sample can, in some instances, be calculated from tables when the values for the total cross section $\sigma_T$ and the Compton cross section $\sigma_C$ of the sample compound are published.

It will therefore be apparent to those skilled in the art that various changes may be made in the invention without departing from the spirit and scope thereof and therefore the invention is not limited by that which is enclosed in the drawings and specifications but only as indicated in the appended claims.

I claim:

1. A method for deriving an indication of the photoelectric absorption properties of a rock sample representative of the lithology of formations penetrated by a well bore, said method comprising the steps of
   irradiating the rock sample with gamma radiation from a low energy source of gamma radiatiion that is sensitive to photoelectric absorption;
   detecting the intensity of gamma radiation penetrating the rock sample by a gamma ray detector positioned in alignment with said low energy source and the rock sample disposed therebetween;
   separating the detected gamma ray intensity data into a first energy spectrum of detected gamma rays;
   obtaining from said first energy spectrum, a measured count rate $N_L$ of gamma radiation in an energy range that is sensitive to photoelectric absorption;
   detecting the intensity of gamma radiation from said low energy radiation source by the detector in the same relative position with respect to said source in the absence of said rock sample;
   separating the detected gamma ray intensity data obtained in the absence of the rock sample into a second energy spectrum of detected gamma rays;
   obtaining from second energy spectrum, a measured count rate $N_{Lo}$ of gamma radiation in said energy range that is sensitive to photoelectric absorption;
   irradiating the rock sample with gamma radiation from a high energy source of gamma radiation in an energy range that has significantly different sensitivity to photoelectric absorption than the low-energy source;
   detecting with said detector the intensity of gamma radiation from said high energy source which penetrates the rock sample with said detector being disposed in the same relative position to the high energy source and the rock sample as pertained in the direction of radiation from said low energy source;
   separating the detected gamma ray intensity data from said high energy source into a third spectrum of detected gamma rays;
   obtaining from said third energy spectrum, a measured count rate $N_H$ of gamma radiation in said energy range of significantly different sensitivity to photoelectric absorption than the low-energy source;
   detecting the intensity of gamma radiation from said high energy source by the detector in said same relative position in the absence of said rock sample;
   separating the detected gamma ray intensity data obtained from said high energy source in the absence of the rock sample into a fourth energy spectrum of detected gamma rays;
   obtaining from said fourth energy spectrum, a measured counft rate $N_{Ho}$ of gamma radiation in said high energy range; and
   deriving from a first function of the count rates $N_L$ and $N_{Lo}$ and a second function of the count rates $N_H$ and $N_{Ho}$ an indicator of the photoelectric absorption properties of the rock sample and the lithology of said formations.

2. The method recited in claim 1 wherein the indicator derived from said first and second functions is a lithology factor L defined as $L=(\sigma_T-\sigma_C)/\sigma_C$ where $\sigma_C$ is the Compton scattering cross section for the sample material, $\sigma_T$ is the total cross section which includes therein the photoelectric, Rayleigh, and binding-energy-corrected Compton cross sections.

3. The method recited in claim 2 further including the step of obtaining a modified photoelectric factor $P_{em}$ from the linear transform relationship $P_{em}=4.389L-0.609$, which factor $P_{em}$ may be used in determining lithology of the rock sample and the formations representative thereof.

4. The method recited in claim 1 wherein said first function is the relationship $\rho_e t\,(L+1)=-c_1 \ln(N_L/N_{Lo})$ wherein $\rho_e$ is the electron density of the sample, t is the thickness of the sample, $c_1$ is as calibration constant obtained by calibration of said first function to the lithology response of the detector, and
said second function is the relationship $$\rho_e t(0.0032L+1)=-c_2 \ln(N_H/N_{Ho})$$

wherein $c_2$ is a calibration constant obtained by calibration of said second function to the electron density response of the detector, and wherein each of said count rates in said first and second functions is obtained by subtraction of background radiation from the measured count rates.

5. The method as recited in claim 1 wherein the low energy source of gamma radiation is americium −241 and the high energy source of gamma radiation is cesium −137.

6. The method recited in claim 1 wherein the energy range sensitive to photoelectric absorption is from 40 keV to 100 keV.

7. The method recited in claim 4 wherein said deriving step includes simultaneously solving the first and second functional relationships for the values of $\rho_e t$ and L whereby the electron density $\rho_e$ of the sample may be determined.

8. A method for deriving a lithology factor corresponding to the photoelectric absorption properties of a sample, said method comprising the steps of:
   irradiating the sample with gamma radiation from a low energy source of gamma radiation that is sensitive to photoelectric absorption;
   detecting the intensity of gamma radiation penetrating the sample by a gamma ray detector positioned in alignment with said low energy source and the sample disposed therebetween;
   separating the detected gamma ray intensity data into a first energy spectrum of detected gamma rays;
   obtaining from said first energy spectrum, a measured count rate $N_L$ of gamma radiation in an energy range that is sensitive to photoelectric absorption;
   detecting the intensity of gamma radiation from said low energy radiation source by the detector in the same relative position with respect to said source in the absence of said sample;
   separating the detected gamma ray intensity data obtained in the absence of the sample into a second energy spectrum of detected gamma rays;

obtaining from second energy spectrum a measured count rate $N_{Lo}$ of gamma radiation in said energy range that is sensitive to photoelectric absorption;

irradiating the sample with gamma radiation from a high energy source of gamma radiation in an energy range that has significantly different sensitivity to photoelectric absorption than the low-energy source;

detecting with said detector the intensity of gamma radiation from said high energy source which penetrates the sample with said detector being disposed in the same relative position to the high energy source and the sample as pertained in the detection of radiation from said low energy source;

separating the detected gamma ray intensity data from said high energy source into a third spectrum of detected gamma rays;

obtaining from said third energy spectrum, a measured count rate $N_H$ of gamma radiation in said energy range of significantly different sensitivity to photoelectric absorption than the low-energy source;

detecting the intensity of gamma radiation from said high energy source by the detector in said same relative position in the absence of said sample;

separating the detected gamma ray intensity data obtained from said high energy source in the absence of the sample into a fourth energy spectrum of detected gamma rays;

obtaining from said fourth energy spectrum, a measured count rate $N_{Ho}$ of gamma radiation in said high energy range; and deriving from a function of said count rates a lithology factor $P_{em}$ indicative of the photoelectric absorption properties of said sample.

9. A method for deriving a lithology factor corresponding to the photoelectric absorption properties of a sample, said method comprising the steps of:

irradiating the sample with gamma radiation from a radiation source which simultaneously produces low energy and high energy gamma radiation wherein the low energy radiation is in an energy range that is sensitive to photoelectric absorption and the high energy radiation is in an energy range that has significantly different sensitivity to photoelectric absorption;

detecting the intensity of gamma radiation which has been attenuated by the sample by a gamma ray detector positioned in alignment with said radiation source and said sample disposed therebetween, separating the detected gamma ray intensity data into an energy spectrum of detected gamma rays;

obtaining from said energy spectrum, a count rate $N_L$ of gamma radiation in the low energy range that is sensitive to photoelectric absorption and a count rate $N_H$ of gamma radiation in said energy range of significantly different sensitivity to photoelectric absorption;

detecting the intensity of gamma radiation from said radiation source by said detector in the absence of said sample, said detector being in the same relative position with respect to said source as when detecting the attenuated radiation;

separating the gamma ray intensity of unattenuated radiation detected in the absence of said sample into a second energy spectrum of detected gamma rays;

obtaining from said second energy spectrum a count rate $N_{Lo}$ of gamma radiation in said energy range that is sensitive to photoelectric absorption and obtaining a count rate $N_{Ho}$ of gamma radiation in said energy range of significantly different sensitivity to photoelectric absorption; and deriving from a first function of the count rates $N_L$ and $N_{Lo}$ and a second function of the count rates $N_H$ and $N_{Ho}$ an indicator of the photoelectric absorption properties of the sample and the lithology.

10. The method recited in claim 9 wherein the indicator derived from said first and second functions is a lithology factor L defined as $L=(\sigma_T-\sigma_C)\sigma_C$ where $\sigma_C$ is the Compton scattering cross section for the sample, $\sigma_T$ is the total cross section which includes therein the photoelectric, Rayleigh, and binding-energy-corrected Compton cross sections.

11. The method recited in claim 10 further including the step of obtaining a modified photoelectric factor $P_{em}$ from the linear transform relationship $P_{em}=4.389L=0.609$, which factor $P_{em}$ may be used in determining lithology of the sample and the formations representative thereof.

12. The method recited in claim 10 wherein said first function is the relationship $\rho_e t(L+1)=-_1\ln(N_L/N_{Lo})$ wherein $\rho_e$ is the electron density of the sample, t is the thickness of the sample, $c_1$ is as calibration constant obtained by calibration of said first function to the lithology response of the detector, and said second function is the relationship $$\rho_e t(0.0032L+1)=-c_2 \ln(N_H/N_{Ho})$$

wherein $c_2$ is a calibration constant obtained by calibration of said second function to the electron density response of the detector, and wherein each of said count rates in said first and second functions is obtained by subtraction of background radiation from the measured count rates.

13. The method recited in claim 12 wherein said deriving step includes simultaneously solving the first and second functional relationships for the values of $\rho_e t$ and L whereby the electron density of the sample may be determined.

14. The method recited in claim 12 wherein the energy range sensitive to photoelectric absorption is from 40 keV to 100 keV.

15. A method for deriving an indication of the photoelectric absorption properties of a rock sample representative of the lithology of formations penetrated by a well bore, said method comprising the steps of:

irradiating the rock sample with gamma radiation from a low energy source of gamma radiation that is sensitive to photoelectric absorption;

detecting the intensity of gamma radiation penetrating the rock sample by a gamma ray detector positioned in alignment with said low energy source and the rock sample disposed therebetween;

separating the detected gamma ray intensity data into a first energy spectrum of detected gamma rays;

obtaining from said first energy spectrum, a measured count rate $N_L$ of gamma radiation in an energy range that is sensitive to photoelectric absorption;

detecting the intensity of gamma radiation from said low energy radiation source by the detector in the same relative position with respect to said source in the absence of said rock sample;

separating the detected gamma ray intensity data obtained in the absence of the rock sample into a second energy spectrum of detected gamma rays;

obtaining from second energy spectrum a measured count rate $N_{Lo}$ of gamma radiation in said energy range that is sensitive to photoelectric absorption;

performing an elemental analysis of said sample to determine the composition thereof;

measuring the bulk density $\sigma_b$ of said sample;

measuring the thickness t of the sample; and determining from the function $\rho_e t(L+1) = -c_1 \ln N_L/N_{Lo})$ a lithology factor L defined as $L=(\sigma_T-\sigma_C)/\sigma_C$ where $\sigma_C$ is the Compton scattering cross section for the rock sample material;

$\sigma_T$ is the total cross section which includes therein the photoelectric, Rayleigh, and binding-energy-corrected Compton cross sections.

16. The method of claim 15 and further including the step of deriving from a function of said count rates a lithology factor $P_{em}$ indicative of the photoelectric absorption properties of said rock sample.

17. The method of claim 16 further including the step of obtaining a modified photoelectric factor $P_{em}$ from the linear transform relationship $P_{em} = 4.389L - 0.609$, which factor $P_{em}$ may be used in determining lithology of the rock sample and the formations representative thereof.

* * * * *